United States Patent Office 3,462,451
Patented Aug. 19, 1969

3,462,451
2,3-BIS(ALKOXYPHENYL)PYRROLES
Jacob Szmuszkovicz, Kalamazoo, Mich., assignor to The Upjohn Company, Kalamazoo, Mich., a corporation of Delaware
No Drawing. Filed Apr. 25, 1966, Ser. No. 544,847
Int. Cl. C07d 27/22, 27/14; A61l 23/00
U.S. Cl. 260—326.5                                2 Claims

ABSTRACT OF THE DISCLOSURE

Bis(alkoxyphenyl)pyrroles and pyrrolines are disclosed. These compounds are useful as central nervous system depressants in animals.

---

This invention is directed to five member N-heterocycles which contain nuclear unsaturation. More particularly, this invention is directed to bis(alkoxyphenyl) pyrroles and pyrrolines.

The compounds contemplated herein are five member N-heterocycles having a partially or completely unsaturated nucleus and represented by the structural formula

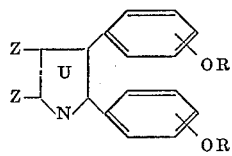

wherein Z can be hydrogen, carboxy, or carbalkoxy radical containing from one to four carbon atoms, inclusive, in the alkyl portion thereof, i.e. carbomethoxy, carbethoxy, the carbopropoxy, or the carbobutoxy radicals, with the further proviso that Z is hydrogen when the nucleus is partially unsaturated, and wherein R can be alkyl radical containing from one to four carbon atoms, inclusive, i.e., methyl, ethyl, the propyl, or the butyl radicals.

Particularly contemplated and preferred compounds within the foregoing structural formula are the bis(alkoxyphenyl) pyrroles which can be represented by the structural formula

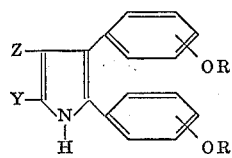

wherein the substituents Z and R are as indicated above.

Also contemplated within the purview of the present invention are the bis(alkoxyphenyl)-1-pyrrolines which can be represented by the structural formula

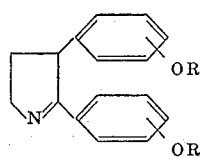

wherein the R substituent is as indicated above.

The compounds represented by Formula III can also exist in the protonated or acid addition salt form. Stable acid addition salts can be formed on neutralization of the bis(alkoxyphenyl)-1-pyrrolines with acids such as hydrochloric, hydrobromic, sulfuric, phosphoric nitric, acetic, benzoic, salicylic, glycolic, succinic, nicotinic, tartaric, maleic, malic, pamoic, methanesulfonic, picric, cyclohexanesulfamic, lactic, and the like.

Several methods are available for the preparation of the compounds of this invention. One method involves the condensation of a dialkyl acetylenedicarboxylate with an aminoketone represented by the structural formula

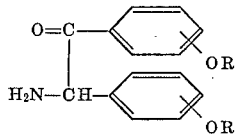

where R is as indicated above.

The latter can be prepared in accordance with the teachings of Drefahl et al., Ann. 589, 82 (1954). The condensation can be carried out in a lower aliphatic alcohol such as methanol, ethanol, the propanols, or the butanols (preferably methanol) as a solvent at a temperature in the range of from about 25° C. to about 100° C. and preferably from about 50° C. to about 80° C. The reaction time can vary from about 15 minutes to about 24 hours. The procedural steps employed in the preparation are similar to those employed by Hendrickson et al., J. Amer. Chem. Soc. 83, 1250 (1961) and in J. Amer. Chem. Soc. 86, 107 (1964).

The resulting end product from the condensation is a dialkyl 4,5-bis(alkoxyphenyl)pyrrole-2,3-dicarboxylate which can be hydrolyzed in the presence of an alkali metal hydroxide, e.g., sodium or potassium hydroxide, or the like, to produce the corresponding 4,5-bis(alkoxyphenyl)pyrrole-2,3-dicarboxylic acid which, in turn, can be decarboxylated by heating to a temperature in the range from about 180° C. to about 250° C. and preferably from about 200° C. to about 230° C. so as to produce a 2,3-bis(alkoxyphenyl)pyrrole. The aforedescribed synthetic route is illustrated below in the preparation of 2,3-bis(p-methoxyphenyl)pyrrole:

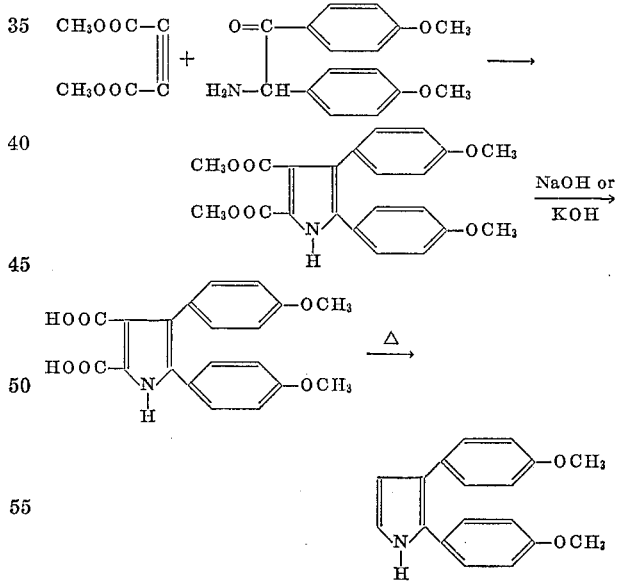

Another method of preparation of the compounds of this invention comprises the reaction of a desoxybenzoin having the structural formula

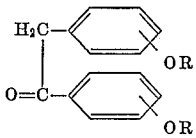

where R is as indicated above, with formaldehyde and a secondary amine either in the free base form or the acid addition salt form to produce the corresponding 1,2 - bis(alkoxyphenyl)-3-dialkylamino-1-propanone. The reaction can be carried out in the presence of an inert reaction medium and at a temperature in the range from about 50° C. to about 150° C. This prepartaion is fully set forth in British Patent 828,762. The thus obtained reaction product can then be condensed with nitromethane in the presence of a sodium or potassium alkoxide, containing up to about four carbon atoms in the alkyl portion thereof, at a temperature in the range from about 40° C. to about 100° C., and thereafter reduced by catalytic hydrogenation in the presence of Raney nickel catalyst to produce a 2,3-bis(alkoxyphenyl)-1-pyrroline. The pyrroline compound can then be dehydrogenated at a temperature in the range from about 150° C. to about 250° C. by using catalytic amounts of a palladium catalyst on a suitable carrier. A solvent such as decalin, p-cymene, or the like, can be employed in the latter step. The synthetic route is schematically illustrated below in the preparation of 2,3-bis(p-methoxyphenyl)pyrrole:

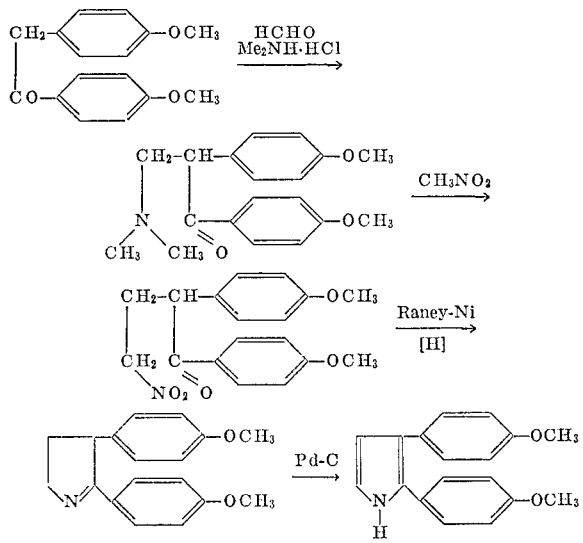

The compounds of this invention are useful as central nervous system depressants in animals, including humans. Their pharmacological activity has been established through tests in rats of 2,3-bis(p-methoxyphenyl)-1-pyrroline, 4,5-bis(p-methoxyphenyl)pyrrole-2,3-dicarboxylic acid, dimethyl 4,5-bis(p-methoxyphenyl)pyrrole-2,3-dicarboxylate, and 2,3-bis(p-methoxyphenyl)pyrrole.

The compounds of this invention absorb ultraviolet light and thus are useful as filters for ultraviolet light or as sun-screening agents. Depending on the contemplated use, these compounds can be incorporated in a substrate that is susceptible to damage by ultraviolet radiation so as to prevent discoloration, lowering of the tensile strength, embrittlement, and to prevent or inhibit chemical reactions activated by ultraviolet radiation. The compounds can also be incorporated into a filter layer or protective coating such as varnish, polyvinyl chloride film, polyvinyl acetate film, polyethylene film, and the like. In addition, the compounds can be incorporated in a pharmaceutically acceptable carrier and used as a cream, oil, ointment, or the like, to minimize sunburn.

According to the type of material treated, to the requirements of effectiveness and durability and other contingencies, the amount of the compound absorbing ultraviolet light may vary within relatively wide limits. For example, for sunburn prevention, from about 0.5% to about 5% by weight of the substrate to be protected, can be the useful range.

This invention is further illustrated by the following examples:

EXAMPLE I

Preparation of dimethyl 4,5-bis(p-methoxyphenyl) pyrrole-2,3-dicarboxylate

A mixture of 2-amino-4'-methoxy-2-(p-methoxyphenyl)acetophenone hydrochloride (about 176 grams, 0.573 mole), dimethyl acetylenedicarboxylate (about 81.5 grams, 0.573 mole), sodium acetate (about 47 grams, 0.573 mole), and methanol (about 1440 milliliters) was placed in a reaction vessel and refluxed for about 15 minutes. Thereafter, the mixture was cooled, 4 N methanolic hydrogen chloride (about 1440 milliliters) was added, and the refluxing continued for about one-half hour.

The refluxing was then terminated and the resulting admixture was evaporated to dryness with stirring in vacuo at about 40° C. The residue thus obtained was then diluted with water (about 1 liter) and stirred so as to produce a suspension. The suspension was then filtered and a yellow solid recovered. The yellow solid was washed with water (about 200 milliliters). Thereafter, a suspension of the washed yellow solid was prepared in water (about 2 liters) and heated on a steam bath while being agitated until all of the starting materials still present went into solution. While hot, the suspension was filtered and a yellow precipitate was recovered.

The yellow precipitate was then washed with hot water (about 200 milliliters), dissolved in methanol (about 2.6 liters), the resulting solution filtered, evaporated to a volume of about 1.2 liters, and cooled while being swirled. A yellow solid (about 29 grams) crystallized out of the methanol solution upon cooling, having a melting point of about 190–192° C. Upon recrystallization from methanol, the melting point was raised to about 192–193° C. A second crop of the yellow solid (about 1.9 grams) was obtained subsequently from the filtrate, having a melting point of about 189–191° C.

The yellow solid was identified as dimethyl 4,5-bis(p-methoxyphenyl)pyrrole - 2,3 - dicarboxylate obtained in about 14% yield.

*Analysis.*—Calc'd for $C_{22}H_{21}NO_6$: C, 66.82; H, 5.35; N, 3.54. Found: C, 67.13; H, 5.52; N, 3.64.

U.V. absorption spectrum in ethanol: $\lambda_{max}=236$ m$\mu$ ($\epsilon=22,800$); sh. 260 m$\mu$ ($\epsilon=15,300$); sh. 283 m$\mu$ ($\epsilon=16,000$); sh. 303 m$\mu$ ($\epsilon=18,550$); 310 m$\mu$ ($\epsilon=18,650$)

In a similar manner, 2-amino-2'-ethoxy-2-(o-ethoxyphenyl)acetophenone can be reacted with dibutyl acetylenedicarboxylate to produce dibutyl 4,5-bis(o-ethoxyphenyl)pyrrole-2,3-dicarboxylate, 2-amino-4'-propoxy-2-(p-butoxyphenyl)acetaphenone can be reacted with diethyl acetylenedicarboxylate to produce diethyl 4-(p-propoxyphenyl)-5-(p - butoxyphenyl)pryrrole - 2,3 - dicarboxylate, 2-amino-4'-butoxy-2-(m-ethoxyphenyl)acetophenone can be reacted with dimethyl acetylenedicarboxylate to produce dimethyl 4-(p-butoxyphenyl)-5-(m-ethoxyphenyl)pyrrole-2,3-dicarboxylate, etc.

EXAMPLE II

Preparation of 4,5-bis(p-methoxyphenyl)pyrrole-2,3-dicarboxylic acid

Dimethyl 4,5-bis(p-methoxyphenyl)pyrrole-2,3-dicarboxylate (about 29 grams, 0.0735 mole) was admixed with methanol (about 580 milliliters), and with a 20 weight percent aqueous solution of sodium hydroxide (about 580 milliliters). The resulting admixture was heated under nitrogen on a steam bath while being stirred. After about five minutes of heating, the admixture began refluxing and a solution was obtained.

After an additional five minutes of refluxing, the solution was observed to have changed into a relatively thick suspension. The refluxing was then continued for about five additional minutes, and thereafter, the methanol was distilled off. The remaining aqueous suspension was cooled on ice and acidified with concentrated hydrochloric acid (about 300 milliliters). During cooling, a solid precipitate was formed.

The solid precipitate was filtered off and washed with water. During washing, the solid precipitate turned oily. The oily solid was then crystallized from acetic acid (about 50 milliliters) and water (about 120 milliliters). About 25.7 grams of a pale yellow product was obtained, having a melting point of about 202–204° C. (dec.). The melting point did not change upon recrystallization from a benzene-acetone solution.

The thus prepared pale yellow product was identified as 4,5-bis(p-methoxyphenyl)pyrrole-2,3-dicarboxylic acid obtained in about 95% yield.

*Analysis.*—Calc'd for $C_{20}H_{17}NO_6$: C, 65.39; H, 4.66; N, 3.81. Found: C, 65.46; H, 4.75; N, 3.97.

U.V. absorption spectrum in ethanol: $\lambda_{max}=237.5$ m$\mu$ ($\epsilon=22,400$); 281 m$\mu$ ($\epsilon=14,400$); sh. 296 m$\mu$ ($\epsilon=12,850$); sh. 318 m$\mu$ ($\epsilon=9,950$).

U.V. absorption spectrum in 0.01 N alcoholic acid: $\lambda_{max}=238$ m$\mu$ ($\epsilon=24,400$); sh. 270 m$\mu$ ($\epsilon=14,100$); 329 m$\mu$ ($\epsilon=9,900$).

U.V. absorption spectrum in 0.01 N alcoholic base: $\lambda_{max}=231$ m$\mu$ ($\epsilon=14,800$); 257.5 m$\mu$ ($\epsilon=19,700$); 288 m$\mu$ ($\epsilon=17.700$); 298 m$\mu$ ($\epsilon=18,700$).

In a similar manner, dibutyl 4,5-bis(o-ethoxyphenyl) pyrrole-2,3-dicarboxylate can be hydrolyzed to 4,5-bis(o-ethoxyphenyl)pyrrole-2,3-dicarboxylic acid, diethyl 4-(p-propoxyphenyl) - 5 - (p - butoxyphenyl)pyrrole - 2,3 - dicarboxylate can be hydrolyzed to 4-(p-propoxyphenyl)-5-(p-butoxyphenyl)pyrrole-2,3-dicarboxylic acid, dimethyl 4 - (p - butoxyphenyl) - 5 - (m - ethoxyphenyl)pyrrole-2,3-dicarboxylate can be hydrolyzed to 4-(p-butoxyphenyl)-5-(m-ethoxyphenyl)pyrrole-2,3-dicarboxylic acid, etc.

EXAMPLE III

Preparation of 2,3-bis(p-methoxyphenyl)pyrrole 4,5-bis(p-methoxyphenyl)pyrrole-2,3-dicarboxylic acid (about 24.16 grams, 0.066 mole) was heated in an oil bath and under nitrogen at a temperature of about 200 to 220° C. (oil bath temperature) for about twenty minutes. Thereafter, the obtained reaction product was distilled off in an oil-jacketed flask at about 240 to 255° C. (oil bath temperature) and about 0.2 to 0.5 mm. of Hg pressure. About 12.91 grams of distillate in the form of a yellow oil was recovered.

The yellow oil was dissolved in diethyl ether (about 200 milliliters). The resulting solution was washed with a 5 weight percent aqueous sodium hydroxide solution (with two aliquots, about 100 milliliters each), then with water, and with a saturated sodium chloride solution. The washed solution was then dried by passing through sodium sulfate and thereafter, the diethyl ether evaporated.

The thus obtained residue (about 12.8 grams) was dissolved in a 20 volume percent ethyl acetate-cyclohexane solution (about 200 milliliters) and chromatographed on silica gel (about 756 grams). Elution with the same solvent (about 3.5 liters) yielded about 12.56 grams of product. This product was then crystallized from petroleum ether (boiling range about 30 to 60° C.) with seeding. About 5 grams of prismatic crystals were obtained upon filtering having a melting point of about 68 to 69.5° C. The melting point did not change upon recrystallization.

The petroleum ether filtrate was evaporated to dryness, the residue dissolved in a 20 volume percent ethyl acetate-cyclohexane solution, passed through a column of silica gel (about 15 grams), eluated, and the eluate crystallized as before. The entire operation was performed as quickly as possible so as to avoid reddening of the resulting crystalline product. Additional 3.9 grams of pink crystals having a melting point of about 68–70° C. was obtained.

The crystalline product obtained in the aforedescribed manner was identified as 2,3-bis(p-methoxyphenyl)pyrrole, in about 49 percent yield.

*Analysis.*—Calc'd for $C_{18}H_{17}NO_2$: C, 77.39; H, 6.13; N, 5.01. Found: C, 76.93; H, 6.55; N, 4.73.

U.V. absorption spectrum in ethanol: $\lambda_{max}=247$ m$\mu$ ($\epsilon=20,100$); 294.5 m$\mu$ ($\epsilon=15,150$).

In a similar manner, 4,5-bis(o-ethoxyphenyl)pyrrole-2,3-dicarboxylic acid can be decarboxylated to 2,3-bis(o-ethoxyphenyl)pyrrole, 4 - (p - propoxyphenyl) - 5 - (p-butoxyphenyl)pyrrole-2,3-dicarboxylic acid can be decarboxylated to 2 - (p-butoxyphenyl)-3-(p-propoxyphenyl) pyrrole, 4 - (p - butoxyphenyl) - 5 - (m - ethoxyphenyl) pyrrole-2,3-dicarboxylic acid can be decarboxylated to 2-(m-ethoxyphenyl)-3-(p-butoxyphenyl)pyrrole, etc.

EXAMPLE IV

Preparation of 2,3-bis(p-methoxyphenyl)-1-pyrroline 1,2 - bis(p - methoxyphenyl) - 3 - dimethylamino - 1-propanone hydrochloride (about 42.6 grams, 0.122 mole) was released to the free base. A mixture was then prepared of the free base, nitromethane (about 213 milliliters), and sodium methoxide (about 0.77 gram), in a suitable reaction vessel and refluxed with stirring for about six hours. A stream of nitrogen was passed through the mixture during refluxing.

The refluxed mixture was then permitted to stand for about 15 hours. Thereafter, water (about 150 milliliters) was added and the resulting admixture was extracted twice with diethyl ether.

The resulting ether extract was washed with a 10 weight percent aqueous hydrochloric acid solution (three aliquots, about 50 milliliters each), a saturated sodium chloride solution, and then dried by passing through sodium sulfate. Thereafter, the ether was evaporated from the dried ether extract and a crude oil (about 50.1 grams) was obtained.

The crude oil was dissolved in ethanol (about 1500 milliliters) and hydrogenated in the presence of about four teaspoons of Raney nickel catalyst at an initial pressure of about 30 p.s.i.g. After about three hours, the hydrogen uptake was observed to have stopped, and the hydrogenation was discontinued.

The resulting mixture was filtered through diatomaceous earth and the filtrate evaporated. Evaporation of the filtrate produced a residue which was dissolved in diethyl ether (about 1 liter). To the ether solution was added a 10 weight percent aqueous hydrochloric acid solution (about 400 milliliters) and the resulting oily hydrochloride was washed with ether by decantation. Thereafter, ice was added to the oily hydrochloride, and the resulting aqueous mixture was basified and extracted with diethyl ether.

The thus obtained ether extract was washed with water and a saturated sodium chloride solution, dried by passing through sodium sulfate, and then the ether evaporated. About 29 grams of oil were obtained.

The oil was chromatographed on silica gel (about 900 grams) using a 50 volume percent ethyl acetate-cyclohexane solution and 1 volume percent triethylamine as the eluant.

Elution was begun with 13 aliquots of about 250 milliliters each which were discarded. Additional elution with 4 aliquots of about 250 milliliters each gave crystalline fractions. These crystalline fractions, when crystallized from diethyl ether, produced about 7.2 grams of crystals having a melting point of about 88 to 89° C. The melting point was unchanged on recrystallization. The crystals were identified as 2,3-bis(p-methoxyphenyl)-1-pyrroline, obtained in about 21% yield.

*Analysis.*—Calc'd for $C_{18}H_{19}NO_2$: C, 76.84; H, 6.81; N, 4.98. Found: C, 76.70; H, 7.39; N, 5.06.

U.V. absorption spectrum in ethanol: $\lambda_{max}=268$ m$\mu$ ($\epsilon=18,200$); sh. 286 m$\mu$ ($\epsilon=10,450$); sh. 295 m$\mu$ ($\epsilon=5,300$).

In a manner similar to Example IV, other pyrrolines can be prepared by suitably choosing the starting materials. The pyrrolines can, of course, be further converted to the corresponding pyrroles in a manner similar to Example VI. Typical illustrative starting materials and the pyrrolines that can be derived therefrom are compiled in the table below:

TABLE ILLUSTRATIVE PYRROLINES

| Starting materials | End product |
| --- | --- |
| Nitromethane and 1,2-bis (p-butoxyphenyl)-3-diethylamino-1-propanone. | 2,3-bis(p-butoxyphenyl)-1-pyrroline. |
| Nitromethane and 1,2-bis(o-ethoxyphenyl)-3-dibutylamino-1-propanone. | 2,3-bis(o-ethoxyphenyl)-1-pyrroline. |
| Nitromethane and 1,2-bis(m-propoxyphenyl)-3-dimethyl-amino-1-propanone. | 2,3-bis(m-propoxyphenyl)-1-pyrroline. |
| Nitromethane and 1-(p-butoxyphenyl)-2-(p-methoxyphenyl)-3-diethylamino-1-propanone. | 2-(p-butoxyphenyl)-3-(p-methoxyphenyl)-1-pyrroline. |
| Nitromethane and 1-(m-ethoxyphenyl)-2-(o-propoxyphenyl)-3-dipropylamino-1-propanone. | 2-(m-ethoxyphenyl)-3-(o-propoxyphenyl)-1-pyrroline. |
| Nitromethane and 1-(p-tert.-butoxyphenyl)-2-(p-butoxyphenyl)-3-dimethylamino-1-propanone. | 2-(p-tert.-butoxyphenyl)-3-(p-butoxyphenyl)-1-pyrroline. |

EXAMPLE V

Preparation of 2,3-bis(p-methoxyphenyl)-1-pyrroline hydrochloride 2,3-bis(p-methoxyphenyl) - 1 - pyrroline is dissolved in benzene and to the resulting solution is added an excess of etherel hydrogen chloride. Upon addition of the latter, a precipitate which is 2,3-bis(p-methoxyphenyl)-1-pyrroline hydrochloride is produced. The precipitate is recovered, washed, and recrystallized in accordance with standard laboratory procedures.

In a like manner, other acid addition salts of the 1-pyrroline can be prepared by employing, instead of etherel hydrogen chloride, an acid such as etherel hydrogen bromide, etherel phosphoric acid, etherel nitric acid, etherel acetic acid, etc.

EXAMPLE VI

Preparation of 2,3-bis(p-methoxyphenyl)pyrrole

A mixture was prepared from 0.8 g. of crude 2,3-bis (p-methoxyphenyl)-1-pyrroline (i.e., not purified by chromatography), 5 weight percent of palladium-on-carbon catalyst (about 0.8 gram), and Decalin (about 10 milliliters). This mixture was placed in a suitable reaction vessel and refluxed for about 6.5 hours.

Thereafter, the resulting admixture was cooled and chloroform was added thereto to dissolve an oil which had separated during the refluxing, and the resulting solution was then filtered through diatomaceous earth. The filtrate was washed with a 10 weight percent aqueous hydrochloric acid solution, water, and a saturated sodium chloride solution, and then dried by passing through sodium sulfate. Thereafter, the filtrate was evaporated at a pressure of about 0.1 mm. of Hg and at room temperature. About 0.7 gram of an oil was obtained as a residue.

The obtained oil was dissolved in methylene chloride and chromatographed on silica gel (about 42 grams). Elution with methylene chloride (about 45 milliliters) gave about 0.22 gram of oil which was then rechromatographed on silica gel (about 22 grams). Subsequent elution with a 10 volume percent ethyl acetate-cyclohexane solution (7 aliquots, about 10 milliliters each) gave about 0.07 gram of an oil which was discarded. Further elution with another 10 milliliters aliquot produced 0.138 gram of a product which was identical to the end product obtained in Example III, i.e., 2,3-bis(p-methoxyphenyl) pyrrole, as established by the comparison of U.V., I.R., and NMR spectra.

I claim:

1. A bis(alkoxyphenyl)pyrrole represented by the structural formula

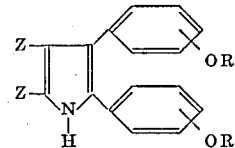

wherein Z is hydrogen, and R is alkyl radical of one to four carbon atoms, inclusive.

2. A bis(alkoxyphenyl)pyrrole in accordance with claim 1 which is 2,3-bis(p-methoxyphenyl)pyrrole.

References Cited

Hendrickson et al.: Chemical Abstracts, vol. 55, p. 13,425g (1961).

Friedman: Chemical Abstracts, vol. 62, p. 16,251c (1965).

Szmuszkovicz et al.: Chemical Abstracts, vol. 65, p. 3,822c (1966).

ALEX MAZEL, Primary Examiner

JOSE TOVAR, Assistant Examiner

U.S. Cl. X.R.

260—326.3; 424—274